US011956311B2

(12) United States Patent
Russkikh

(10) Patent No.: US 11,956,311 B2
(45) Date of Patent: Apr. 9, 2024

(54) METHOD AND APPARATUS FOR DIRECT MEMORY ACCESS OF NETWORK DEVICE

(71) Applicant: Marvell Asia Pte, Ltd., Santa Clara, CA (US)

(72) Inventor: Igor Russkikh, Nizhny Novgorod (RU)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 18/012,190

(22) PCT Filed: Jun. 29, 2020

(86) PCT No.: PCT/RU2020/000323
§ 371 (c)(1),
(2) Date: Dec. 21, 2022

(87) PCT Pub. No.: WO2022/005322
PCT Pub. Date: Jan. 6, 2022

(65) Prior Publication Data
US 2023/0262123 A1 Aug. 17, 2023

(51) Int. Cl.
*H04L 67/1097* (2022.01)
*H04L 69/22* (2022.01)

(52) U.S. Cl.
CPC .......... *H04L 67/1097* (2013.01); *H04L 69/22* (2013.01)

(58) Field of Classification Search
CPC ..... H04L 67/1097; H04L 69/22; H04L 67/01; H04L 67/10; G06F 5/16; G06F 12/1081; G06F 15/173; G06F 15/17331; G06F 15/1733

USPC .......................................... 709/223
See application file for complete search history.

(56) References Cited

U.S. PATENT DOCUMENTS

| 7,171,500 | B2 * | 1/2007 | Day | H04L 67/14 370/254 |
| 7,584,319 | B1 * | 9/2009 | Liao | G06F 13/4031 710/317 |
| 7,865,638 | B1 * | 1/2011 | Wyatt | G06F 12/0284 711/170 |
| 8,271,996 | B1 * | 9/2012 | Gould | G06F 9/542 719/330 |

(Continued)

FOREIGN PATENT DOCUMENTS

EP 3066557 A1 * 9/2016 ............... G06F 5/16

*Primary Examiner* — Sargon N Nano

(57) ABSTRACT

A computer device in a network receives data units sent by a remote computer device over a network link in a sequenced order. A traffic monitor evaluates traffic on the network link, and selectively sends congestion notifications in response to determining that certain data units sent by the remote computer device have been received or will likely be received out of the sequenced order. The notifications cause the remote computer device to pause sending further data units. An ingress processor, separate from a central processing unit (CPU) of the computer device, detects a header segment of a received data unit and a corresponding payload segment of the received data unit. A storage controller stores the header segment of the received data unit in a first memory location, and stores the payload segment of the received data unit in a second memory location separate from the first memory location. The second memory location corresponds to a next location in a storage queue.

16 Claims, 8 Drawing Sheets

(56) References Cited

U.S. PATENT DOCUMENTS

| | | | | |
|---|---|---|---|---|
| 8,325,633 | B2* | 12/2012 | Archer | G06F 13/28 |
| | | | | 370/282 |
| 9,471,821 | B2* | 10/2016 | Mats | G06F 1/266 |
| 9,952,945 | B2* | 4/2018 | Matsuo | G06F 11/201 |
| 10,387,277 | B2* | 8/2019 | Matsuo | G06F 11/2007 |
| 2002/0031086 | A1* | 3/2002 | Welin | H04L 47/24 |
| | | | | 370/428 |
| 2005/0238035 | A1* | 10/2005 | Riley | H04L 49/35 |
| | | | | 370/401 |
| 2006/0004975 | A1* | 1/2006 | Matheny | G06F 9/342 |
| | | | | 711/202 |
| 2006/0072564 | A1* | 4/2006 | Cornett | H04L 69/16 |
| | | | | 370/389 |
| 2006/0221974 | A1* | 10/2006 | Hilla | H04L 47/2441 |
| | | | | 370/412 |
| 2010/0183032 | A1* | 7/2010 | Michalewicz | H04L 65/80 |
| | | | | 370/474 |
| 2011/0096774 | A1* | 4/2011 | Qu | G06F 13/28 |
| | | | | 370/389 |
| 2015/0055661 | A1* | 2/2015 | Boucher | H04L 67/10 |
| | | | | 370/421 |
| 2015/0124833 | A1* | 5/2015 | Ma | H04L 47/62 |
| | | | | 370/412 |
| 2016/0232111 | A1* | 8/2016 | Chang | G06F 13/4282 |
| 2019/0104106 | A1* | 4/2019 | Kumar | G06F 9/445 |
| 2021/0303456 | A1* | 9/2021 | Shin | G06F 12/1408 |
| 2023/0087447 | A1* | 3/2023 | Li | G06F 16/275 |
| | | | | 707/611 |

* cited by examiner

US 11,956,311 B2

METHOD AND APPARATUS FOR DIRECT MEMORY ACCESS OF NETWORK DEVICE

CROSS REFERENCES TO RELATED APPLICATIONS

This application is a national stage application of international application number PCT/RU2020/000323, filed Jun. 29, 2020, and expressly incorporated by reference in its entirety.

TECHNICAL FIELD

The disclosure herein relates to communications systems, and more specifically to high-speed networking systems and methods.

BACKGROUND

Data exchanges between respective memories of remote computer devices over a network are often performed using a Remote Direct Memory Access (RDMA) technologies. RDMA generally allows for data exchanges between remote computer memories with minimal involvement of respective host processors, caches, or operating systems. As a result, host computing resources that would otherwise be involved in the data exchanges may be used for other processing tasks.

While the RDMA technology is often considered to be advantageous when used for its intended applications, since RDMA technology includes several protocols, computer devices engaged in RDMA data exchange need to support the same RDMA protocol. Moreover, RDMA protocols are often viewed as a "hardware-assisted" protocol set in the sense that they utilize specialized circuitry and hardware blocks to assist with direct placement of data in remote memory. Moreover, RDMA software protocol stacks may be difficult to integrate into some applications, such as for example applications running in some embedded and/or automotive Ethernet environments, and existing RDMA protocols are considered to have relatively large power requirements in comparison to conventional wired networking protocols.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Figure 1:
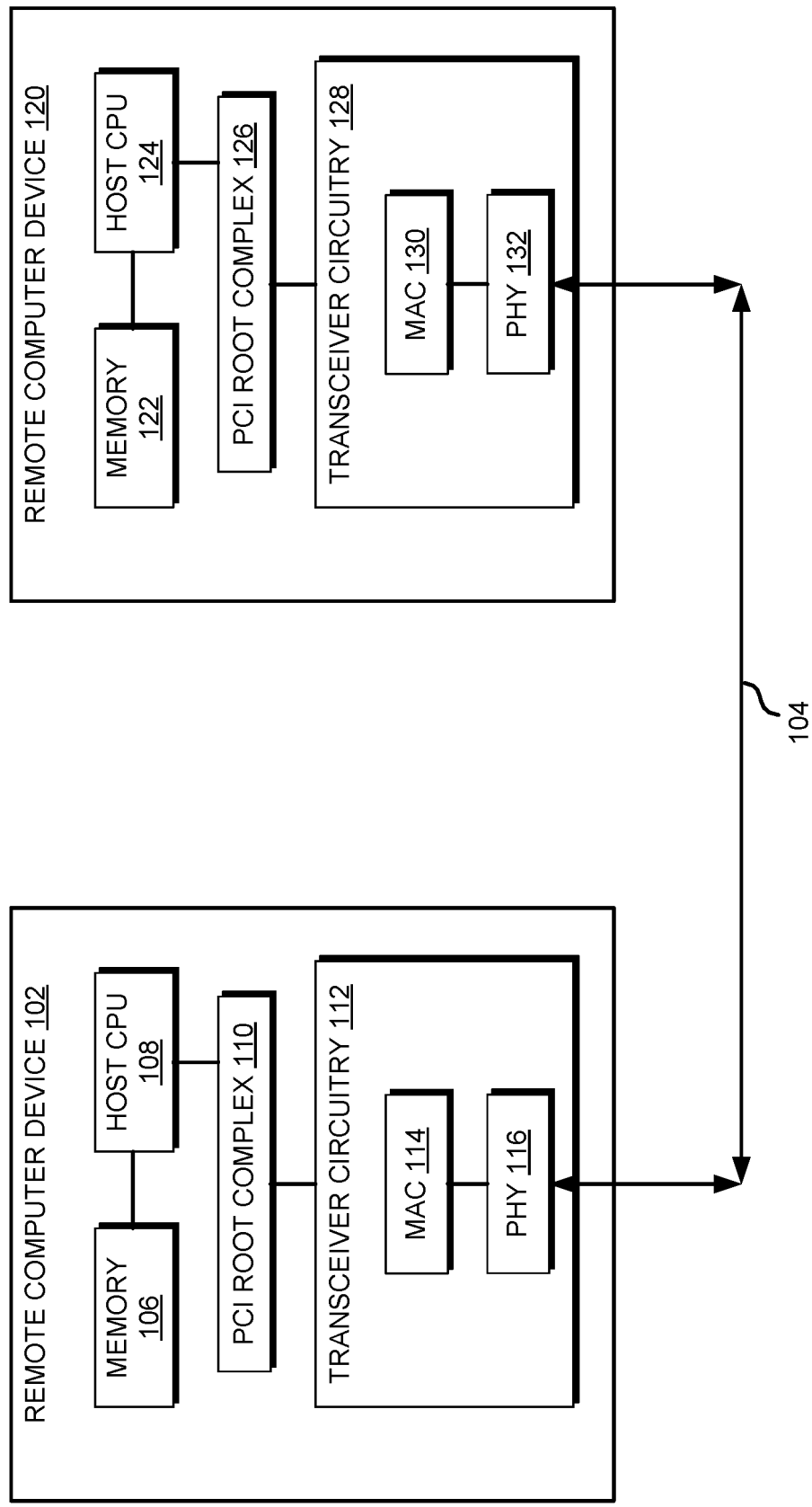
FIG. 1 illustrates one high-level embodiment of a first network device interfacing with a second network device via a communications link, in accordance with an embodiment.

Methods and apparatus for exchanging data from remote computer device memories are disclosed. In one embodiment, a computer device includes a network interface that receives data units sent by a remote computer device over a network link in a sequenced order. A traffic monitor evaluates traffic on the network link, and selectively sends congestion notifications in response to determining that certain data units sent by the remote computer device have been received or will likely be received out of the sequenced order. The notifications cause the remote computer device to pause sending further data units in order to maintain ongoing receipt of data units in the sequenced order. An ingress processor, separate from a central processing unit (CPU) of the computer device, detects a header segment of a received data unit and a corresponding payload segment of the received data unit. A storage controller stores the header segment of the received data unit in a first memory location and stores the payload segment of the received data unit in a second memory location separate from the first memory location. The second memory location corresponds to a next location in a storage queue. By utilizing ingress processor resources that are separate from the CPU, storing the received data segments in a manner that is based on the sequenced order, and by selectively causing the transfer of data units to be paused to avoid out of order receipt of data units and thus ensure that the sequenced order of received data units is maintained in an ongoing manner, significant power and cost reductions may be realized for direct memory access (DMA) transfers between remote computing devices.

For some embodiments, the ingress processor is further configured to split the detected header segment of the received data unit from the payload segment of the received data unit. In some situations, the storage controller is configured to detect the header segment based on identifying descriptor information indicating at least a destination location of the second memory location for the payload segment.

In one embodiment, the second memory location is configured as a data queue, and independent of the first memory location. For such an embodiment, the storage controller is configured to store a currently received payload segment in the data queue as-received via the network link, such that the currently received payload segment is stored in a first data queue storage location of the data queue following a second data queue storage location storing a most-recently received payload segment.

For some specific embodiments, the second memory location is configured as a ring buffer. The ring buffer includes multiple storage elements to store respective data entries. An oldest entry pointer indicates a storage element storing an oldest data entry, while a newest entry pointer indicates a location of a newest data entry. A controller dispatches oldest data entries from the ring buffer based on the oldest entry pointer, and receives new entries into the ring buffer based on the newest entry pointer. In other embodiments, the second memory location is configured as a linked list. The linked list includes multiple storage elements, where a first storage element of the multiple storage elements is logically coupled to a next storage element that is physically remote from the first storage element.

In a further embodiment, a method of operation of a computer device on a network includes receiving a plurality of data units sent by a remote computer device over a network link, the plurality of data units transferred by the remote computer device in a sequenced order. Traffic is monitored on the network link, and involves selectively sending congestion notifications over the network link to the remote computer device, in response to having sensed that certain data units sent by the remote computer device have been received or will likely be received out of the sequenced order. The congestion notifications cause the remote computer device to temporarily pause sending further data units to maintain ongoing receipt of data units in the sequenced order. A header segment of a received data unit and a corresponding payload segment of the received data unit is detected by an ingress processor, separate from a central processing unit (CPU) associated with the computer device. The header segment of the received data unit is stored in a first memory location, and the payload segment of the received data unit is stored in a second memory location, the second memory location corresponding to a next location in a storage queue.

In yet another embodiment, a computer device includes a network interface configured to transmit a plurality of data units in a sequenced order to a remote computer device via a network link. A traffic monitor is configured to receive traffic control signals from the remote computer device. The traffic control signals indicate that certain data units received by the remote computer device have been received or will likely be received out of the sequenced order, to cause the interface to temporarily pause sending further data units. An egress processor, separate from a central processing unit (CPU) associated with the computer device, is configured to aggregate data segments stored in separate storage locations of a memory into the plurality of data units and to queue the plurality of data units in the sequenced order for sending by the transmit interface to the remote computer device.

In some embodiments, for respective ones of the plurality of data units, the egress processor is configured to generate packet headers based on a respective first header descriptor representing packet header information and a respective second descriptor representing data information associated with a corresponding data payload of a corresponding one of the plurality of data units.

Referring now to FIG. 1, a pair of remote computer devices 102 and 120 are shown in communication with each other via a networking communications link such as an Ethernet link 104. For purposes of brevity and simplicity, only network device interface features are shown and described below. it being noted that the network device interface feature that are seen are part of computer devices which are not depicted in their respective totality. The first remote computer device 102 includes memory 106 in the form of host/storage memory that provides storage functionality for a host central processing unit (CPU) 108. The memory may take the form of system main memory, a buffer memory, register storage, or any other form of bulk capacity storage. A PCI root complex device 110 is configured to connect the CPU and memory subsystem to a network switch fabric that employs transceiver circuitry 112 in the form of one or more network switches or Ethernet transceiver circuits, in an embodiment. Each Ethernet transceiver circuit includes an Ethernet Media Access Controller (MAC) 114 and an Ethernet physical (PHY) circuit 116. The second remote computer device 120 is provided with components and functionalities that are substantially similar to the first remote computer device 102, including its own memory 122 coupled to a second CPU 124, PCI root complex 126, and Ethernet transceiver circuitry 128. Like the first remote computer device 102, the transceiver circuitry 128 of the second remote computer device 120 includes a MAC 130 and PHY 132. The remote computer devices 102 and 120 may take the form of any general computing device configured for operation in a networking environment such as a server, mobile phone, tablet, network device, automotive network controller and so forth.

Figure 2:
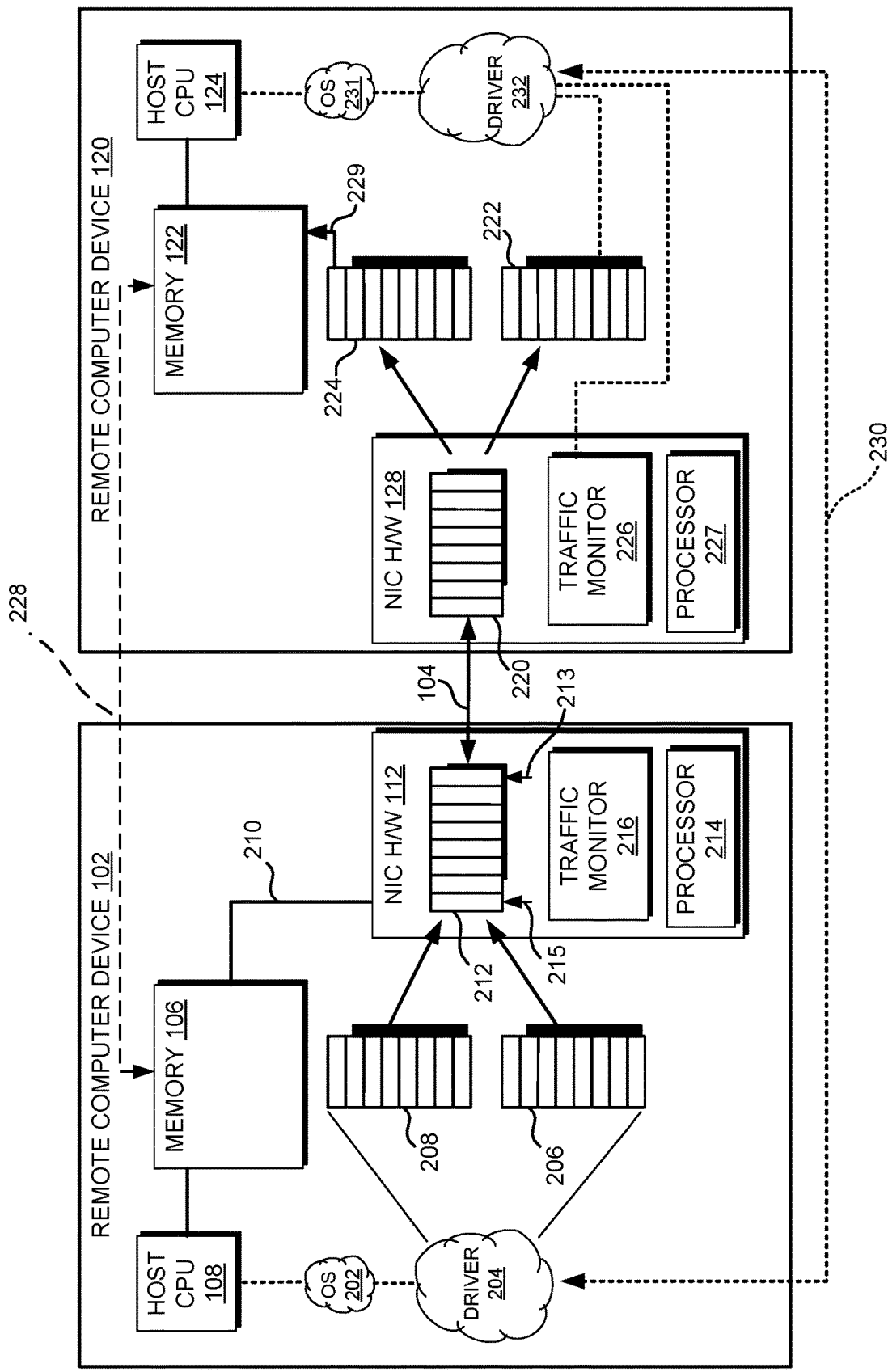
FIG. 2 illustrates further detail of the hardware and software utilized in the first and second network devices of FIG. 1, in accordance with an embodiment.

FIG. 2 illustrates various details of an embodiment of the remote computer devices seen in FIG. 1, including further details relating to various hardware and associated software-based protocol features. The hardware and software features cooperate to provide straightforward direct memory access (DMA) and data transfer functions between the remotely located first computer device 102 and the second computer device 120 using networking protocols, such as those based on the IEEE 802.1 series of protocols. To assist in carrying out the straightforward DMA functionality, operating system (OS) software 202 employs a control driver 204 to manage DMA transfer operations in a manner that reduces the need for processing resources from the host CPU 108. This is generally accomplished in an embodiment by virtually slicing the memory 106 into multiple data segments, and preconfiguring header information in the form of header descriptors for each virtually-sliced data segment in a header queue 206, and preconfiguring data descriptors for each data segment in a data queue 208. For one embodiment, header queue entries and data queue entries, which are separate queues, are assembled and wrapped with the corresponding data segments to form data units, such as packets, using a scatter-gather, or other suitable, operation.

Further referring to FIG. 2, the first remote computer device 102 includes a direct data fetch path 210 between the memory 106 and the Ethernet transceiver hardware 112. The direct data fetch path 210 is configured such that data from the memory 106 may be directly accessed by the Ethernet transceiver hardware 112, and transferred by the Ethernet transceiver hardware across the Ethernet link 104 with little to no intervention on the part of the host CPU 108.

With continued reference to FIG. 2, for one embodiment, the Ethernet transceiver hardware 112 takes the form of a Network Interface Controller (NIC). The NIC includes a queue 212 that receives the scatter-gathered data units, or packets, for transfer across the Ethernet link 104 in an ordered sequence that minimizes power and complexity involved in reconstructing the memory at the receiving remote computer device 120. In accordance with an embodiment that is described herein as an example, the queue 212 takes the form of a ring or circular buffer that includes a head pointer, at 213, indicating where a next packet is to be transferred out of the buffer, and a tail pointer, at 215, indicating where a newly added packet is to be added to the buffer. One feature of a circular buffer includes a wrap-around functionality in a linear buffer, which is controlled by manipulating the head and tail pointers 215 and 213. In a further embodiment, the transmit queue may take the form of a linked list of buffer elements that are logically correlated. Such a configuration includes one or more buffer elements that are logically coupled to a next buffer location that is physically remote from a previous buffer location.

Further referring to FIG. 2, one embodiment of the NIC 112 further includes an egress processor 214 that provides local processing resources, from the perspective of the NIC 112, for the DMA transfer in an offloaded manner from the host CPU 108. The egress processor 214 may take the form of a discrete system on chip, or integrated circuit (IC) that is integrated into the NIC architecture as an embedded processor. Also included in the NIC 112 is a traffic monitoring receiver 216 that cooperates with a receive-side traffic monitor (described below) to detect traffic congestion indicators along the link 104 in the form of "Pause" and/or "Resume" frames from the receiving remote computer device 120. For one specific embodiment, the traffic monitoring receiver performs priority-based flow control functions, compliant with IEEE 802.1Qbb. A "Pause" frame indicates that packets should not be sent by the remote computer device 120. Otherwise they are likely to be received out of the order, or dropped. Subsequent receipt of a "Resume" signal indicates that transfers may begin again. As explained more fully below, the use of the Pause and Resume frames assists in maximizing the reliability and robustness of the transmitted sequenced order of packets, thereby ensuring that the packets are received by the receiving remote computer device in their intended sequenced order.

At the receive side of the link 104, and further referring to FIG. 2, the receiving remote computer device 120 generally includes circuitry and software similar to the transmitting remote computer device, although configured for inverse operations so as to unwrap received packets and load the remote memory 122 in a manner that fully mirrors or duplicates the transmitting device memory 106. To receive the packets coming across the networking link 104, the receiving Ethernet transceiver circuitry 128 takes the form of a receiving NIC. The receiving NIC includes a receiving queue 220 formed similar to that of the transmit queue 212 to load received packets in a sequenced manner that corresponds to the ordered sequence of packets transmitted by the transmit NIC 112. For one embodiment, the receiving NIC 128 includes header-splitter hardware that, for each packet exiting the queue 220, automatically splits the packet header from the data payload. A storage controller employed by the header-splitter hardware manages loading of the split headers into a header buffer 222 and loading the split data segments sequentially into a data buffer 224. For one embodiment, the data buffer is configured as a ring buffer, including multiple storage elements and a head pointer indicating a location of an oldest data entry, and a tail pointer indicating a location of a newest data entry. For such an embodiment, the sequential loading of the data segments into the data buffer is carried out to match the ordered sequencing of the as-received packets. In another embodiment, the data buffer is configured as a linked list, such that a first buffer element location is logically coupled to a next element location that is physically remote from the first buffer location.

To confirm the ordered sequencing, the receiving NIC 128 employs the receive-side traffic monitor 226, similar to that of the traffic monitor 216 of the transmit NIC 112. The receive-side traffic monitor is responsive to a receiving control driver 232 on the receiving network device 120 to generate and send the "Pause" or "Resume" frames to the transmitting network device 102 based on a level of traffic congestion along the link 104. For one embodiment, the control driver 232 reviews the contents of the header buffer 222 to confirm that the received packets were received in the proper ordered sequence.

Further referring to FIG. 2, the receiving remote computer device 120 includes a direct data placement path 229 between its data buffer 224 and memory 122. When linked, the transmitting and receiving remote computer devices 102 and 120 establish a virtual data plane, at 228, between the two memories 106 and 122. Similarly, a virtual control plane 230 is established between the respective host CPU control drivers 204 and 232 associated with the two remote computer devices 102 and 120.

In operation, the memory 106 of the first remote computer device may be mirrored and transferred from the first remote computer device 102 to the second remote computer device 120 by generally (1) mapping the data area of the memory into "jumbo" packet-sized data batches, (2) preconfiguring packet headers for the mapped data batches, (3) wrapping each data batch with a corresponding preconfigured header to form a data unit such as a packet, and (4) transferring the packet to the second network device where it carries out substantially inverse operations to reconstruct the original memory.

Figure 3:
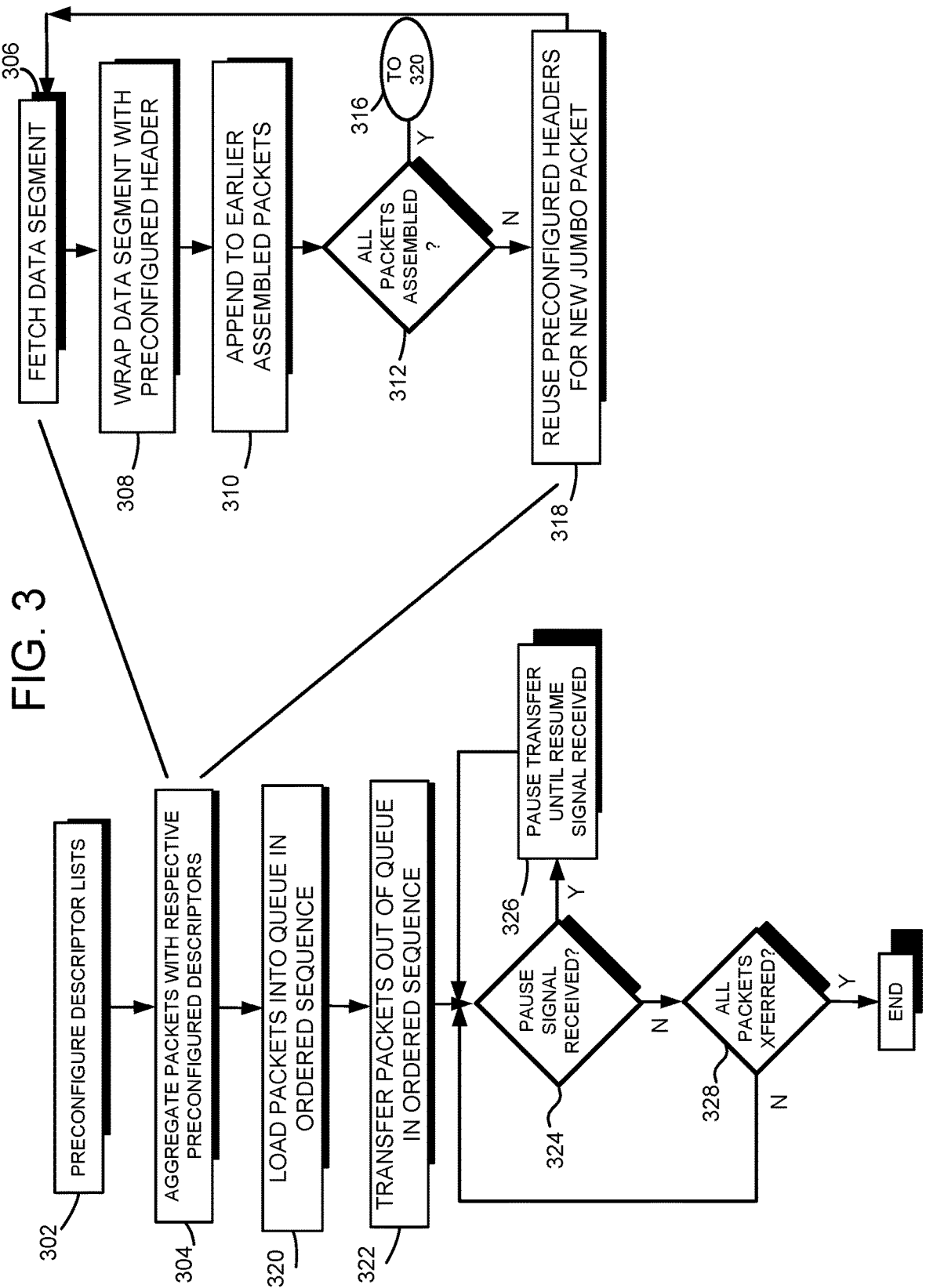
FIG. 3 illustrates a flowchart of operations for operating the transmitting network device of FIG. 2, in accordance with an embodiment.

FIG. 3 illustrates one embodiment of a method of carrying out transmit-side (egress) bulk mapping operations to carry out memory mirroring of the memory 106 to the memory 122. For one embodiment, the transmit operations involve first preconfiguring the descriptor queues 206 and 208 (FIG. 2), at 302. The descriptor queues represent the sets of packet descriptors that specify information for a virtually individually-divided portion of the memory 106. Each virtual-divided portion, or data batch, generally corresponds to a configurable "jumbo" Ethernet packet size, such as, for example 4 Kbytes, although no limits to the size of a given jumbo packet are necessary.

For one embodiment, the preconfiguring of the descriptor queues is performed during an initialization mode of operation, such as a link start-up sequence. During the initialization mode, the memory 106 containing the data of interest may be pre-mapped into the virtual data batches, each of the desired jumbo packet payload size. For example, a memory of 100 Mbytes would be virtually pre-mapped with 25K data descriptors, each representing a data batch of 4 Kbytes. Preconfigurations of Ethernet/VLAN headers may also be made for each of the Ethernet packets during the initialization mode. The initialization mode may then result in the filled header and data descriptor queues 206 and 208 (FIG. 2). As explained below, preconfiguring the header and data descriptor queues minimizes activity on the part of the host CPU during DMA operations. While described in the context of an initialization mode, the preconfiguring of the descriptor queues may alternatively be performed during a normal runtime mode of operation.

Following completion of the preconfiguring of the descriptor queues, application layer software may need access to data, requesting a transfer of the contents of the memory 106 to the memory 122 of the remote computer device 120. A DMA transfer of the data from the memory 106 may be triggered by the control driver 204 that indicates a ring tail setup operation for the queue 212. The control driver 204 manages initiation of the transfer by aggregating the pre-mapped data segments of the memory 106 with the preconfigured headers, at 304 (FIG. 3), to form networking packets.

Further referring to FIG. 3, for one embodiment, the aggregating operation 304 includes first fetching a data segment, corresponding to a virtually-sliced data batch, from the memory 106 via the direct data path 210, at 306. The data segment is then wrapped with the header/data descriptor information, at 308. The wrapped data segment, as a jumbo packet, is then appended to any earlier assembled jumbo packets, at 310. A determination is then made, at 312, as to whether the most recently appended packet completes formation of a collection of packets necessary to transfer all of the data contents of the memory 106. If the aggregation of the packets is not complete, then a new data segment is fetched, at 306, and the jumbo packet formation operations 308, 310 and 312 continue. If the collection of packets is completed that reflects the complete contents of the memory 106, at 312, then the aggregating operation 304 is complete, at 316, and the completed collection of packets may be loaded into the queue 212, at 320. If the most recent jumbo packet does not complete the collection of packets necessary to reconstruct the memory 106, then the list of preconfigured data descriptors is reused, at 318, by the control driver to assemble a subsequent jumbo packet, and the jumbo packet collection operations 306, 308, 310 and 312 are repeated.

The aggregating of the data segments into the collection of jumbo packets by reusing the preconfigured descriptor lists enables the DMA transfers to proceed with minimal host CPU overhead and accompanying power dissipation. The reusing of the descriptor queue contents provides a form of shortcut that can be utilized by the driver control software, thereby avoiding traditional "copy" operations involving the host CPU to duplicate memory contents for transfer as traditional smaller packets.

Further referring to FIG. 3, once the completed collection of packets is loaded into the queue 212 in the ordered sequence, the packets may then be transferred to the remote computer device 120 in the ordered sequence, at 322. During transfer, the traffic monitor 216 continuously makes determinations, at 324, as to whether any "Pause" frames have been received from the remote computer device 120, the Pause frames possibly indicating network traffic congestion that might affect the ordered sequence of packets being transferred. For one embodiment, the networking protocols described herein to facilitate straightforward low-power DMA transfers do not necessarily guarantee reception of network traffic between the remote computer devices. The traffic monitors 216 and 220 of both remote computer devices 102 and 120 cooperate to minimize the risk of an out-of-sequence packet by sensing the flow of packets and issuing/receiving traffic flow signals in response to detecting receiver stall or not ready conditions. Such a condition potentially indicates that a wrap-around event may occur in the receive queue due to minimal queue entries being available to receive new packets, increasing the risk of writing over a packet that has not yet sequenced out of the receive queue. In this regard, if a Pause frame has been received by the traffic monitor 216 from the remote network device 120, at 324, then further packet transfers are paused, at 326, until a Resume frame is received. If no Pause frames have been detected, then a further determination is made, at 328, as to whether all of the packets have been transferred. If packets remain to be transferred, then the traffic monitoring continues at 324, and the packet transfers continue. If all of the packets have been transferred, then the transfer operation from the transmit queue 212 is complete, at 330.

Figure 4:
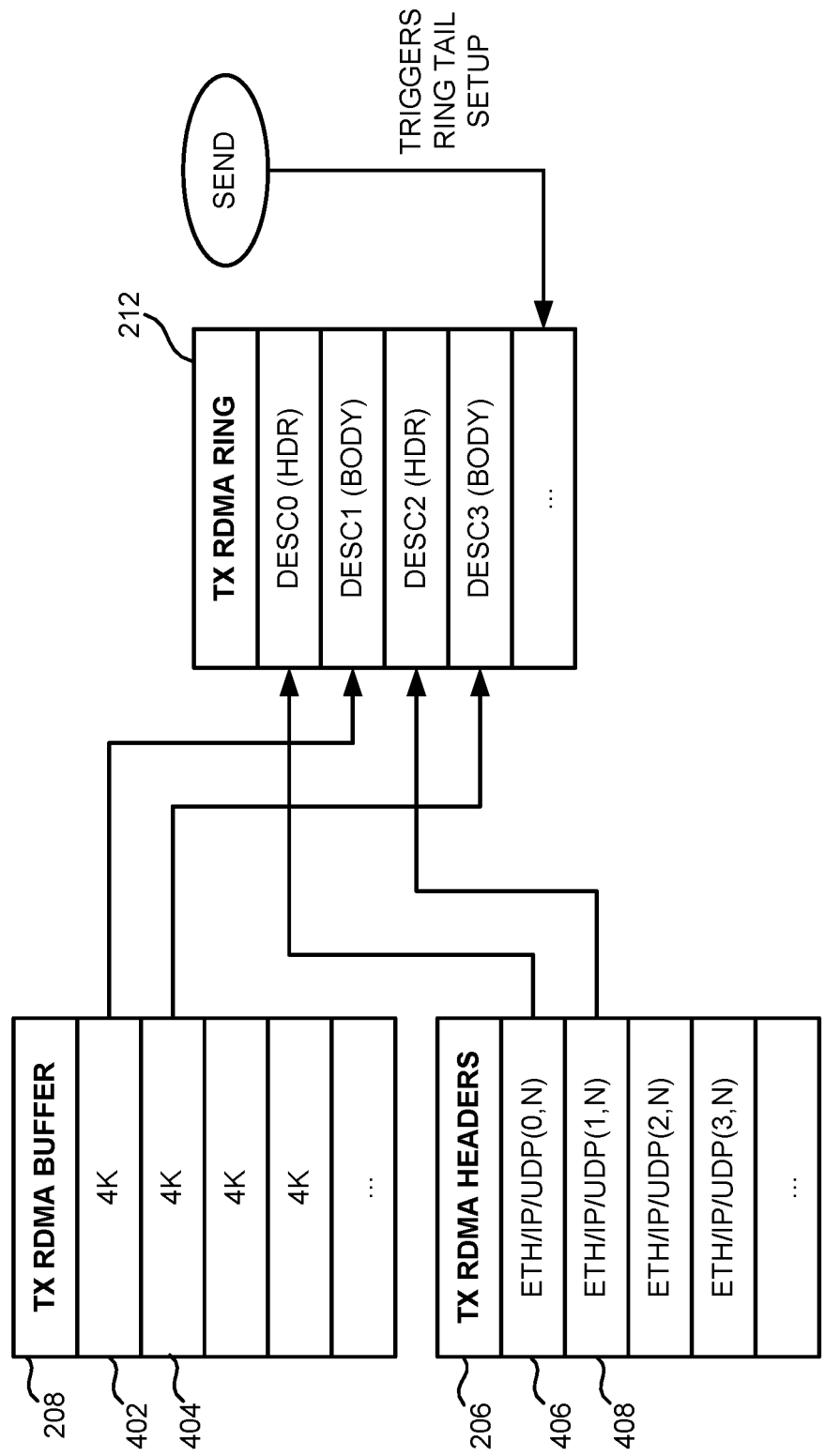
FIG. 4 illustrates one embodiment of descriptor lists corresponding to the contents of the memory of FIG. 2, aggregated to fill the transmit ring buffer of FIG. 2 in a sequenced order.

As an aid to further understanding the preconfiguring and aggregating operations 302 and 304 of FIG. 3, specific embodiments of the ring descriptor queues 206 and 208 are shown in FIG. 4, and how they are assembled into the transmitting network device queue 212. For one embodiment, the data buffer 208 includes multiple data descriptors, such as those at 402 and 404, representing data information for first and second data batches, and specifying a payload size of, for example, 4 Kbytes each. Such packet payload sizes typically correspond to "jumbo" packet payloads. The header buffer 206 includes header descriptors, such as at 406 and 408, corresponding to each of the data descriptors. The header descriptor information may include service information such as a current packet offset (buffer offset), total number of packets to reconstruct the memory, and so forth. In some embodiments, additional information may be included in the header such as the source destination MAC address, IP address, and so forth.

Figure 5:
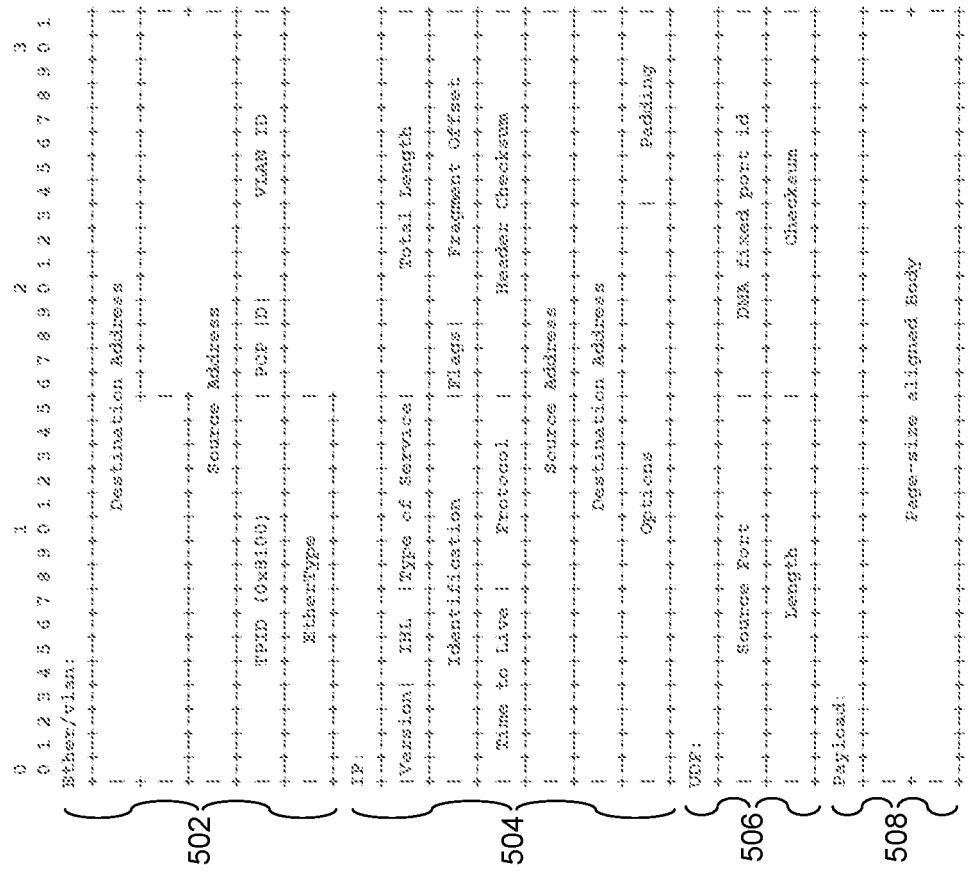
FIG. 5 illustrates one embodiment of a packet frame for a data segment payload aggregated with its corresponding ring descriptors for loading into the transmit queue of FIG. 2.

One specific embodiment of a packet frame format including representative descriptor information and a data segment payload is shown in FIG. 5. The frame format includes a first set of fields directed to Ethernet/VLAN protocol information, at 502. The Ethernet/VLAN information may include a Destination address, Source address, and suitable Identifier (for instance a channel Identifier or VLAN ID). A second set of fields, at 504, may be provided in the frame that includes Internet Protocol (IP) information such as a Total Length of the packet, a Fragment Offset, and a Header Checksum. A further set of header fields pertain to User Datagram Protocol (UDP) information, at 506, including a Source Port, Packet length, and Checksum to assist in verifying the header ordering when reconstructing the buffer at the receive-side network device. The data segment payload is then incorporated into the frame, at 508.

Figure 6:
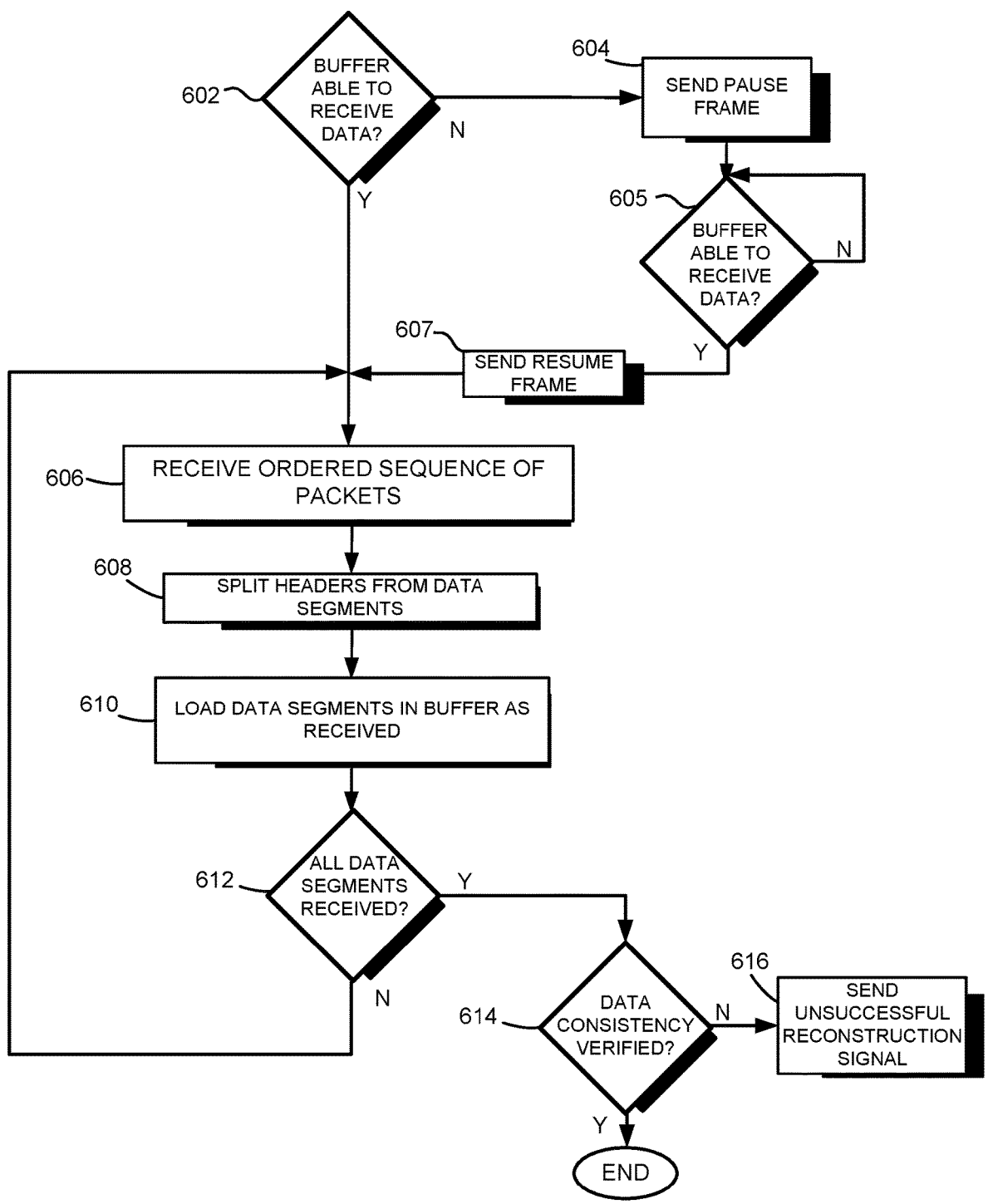
FIG. 6 illustrates a flowchart of operations for one embodiment of a method of operating the receiving network device of FIG. 2.

At the receive side of the network link 104, and referring now to FIG. 6, prior to receiving packets from the network link 104, the receive-side traffic monitor 226 determines whether the receiving queue 220 (FIG. 2) is able to receive further packets, at 602. This may be accomplished by monitoring the difference between the total number of queue storage elements to available queue storage elements. Once the difference reaches a threshold minimum number of available queue elements, then the "Pause" frame may be generated and dispatched, at 604, to the transmit remote computer device 102. When the receiving queue is available, at 605, the receive-side traffic monitor generates the "Resume" frame, at 607, fed back to the first remote computer device indicating the queue's availability. This backchannel over the simultaneously bidirectional Ethernet link provides a way to control backpressure along the link in a manner that avoids a wrap-around event at the receiving queue 220, thereby preserving the desired order and batching of the packets.

Assuming the receive-side queue 220 is able to receive further packets, at 602, the further packets are received by the NIC queue in the ordered sequence, at 606. After a number of cycles corresponding to the capacity of the queue, the received packets exit the queue (in the order received) and immediately undergo a header-split operation, at 608. For one embodiment, to minimize complexity, cost, and host CPU cycles, the header-split operation is automatically performed by the ingress processor 227 of the receiving NIC hardware 128. The ingress processor 227 is able to detect, based on the header descriptor information of the packet, the header/data boundary within a packet and separate the header information from the data payload. Once split, the header information from each packet is listed in the receive header buffer 222, while the data payload is routed to the data buffer 224 in its relative ordered sequence with respect to the previously received data payloads. As the data buffer fills, the earliest received data segments are loaded into the memory 122 in a sequence corresponding to the ordered sequence, at 610. The receiving control driver 232 manages receipt and storage of the data segments and determines, at 612, whether all of the expected data segments have been received. If not, then the receiving operations continue with receiving further packets, at 606. If all of the segments have been received, then the control driver 232 accesses the receive header buffer 222 and determines whether the headers arrived in the proper ordered sequence, at 614. If the headers failed to arrive in the proper sequence, then a command is issued to the traffic monitor 226 to transmit a signal indicating an unsuccessful reconstruction condition, at 616, to the transmit network device 102, and initiate remedial action to have an error-free sequence of packets retransmitted. The corresponding received data from the prior packet transmissions is discarded, to be replaced by the subsequent retransmitted packet sequence. If the proper ordered sequence is verified, at 614, then the receiving stops, and the memory 122 is deemed to have been successfully reconstructed as a mirror of the transmit network device memory 106.

Figure 7:
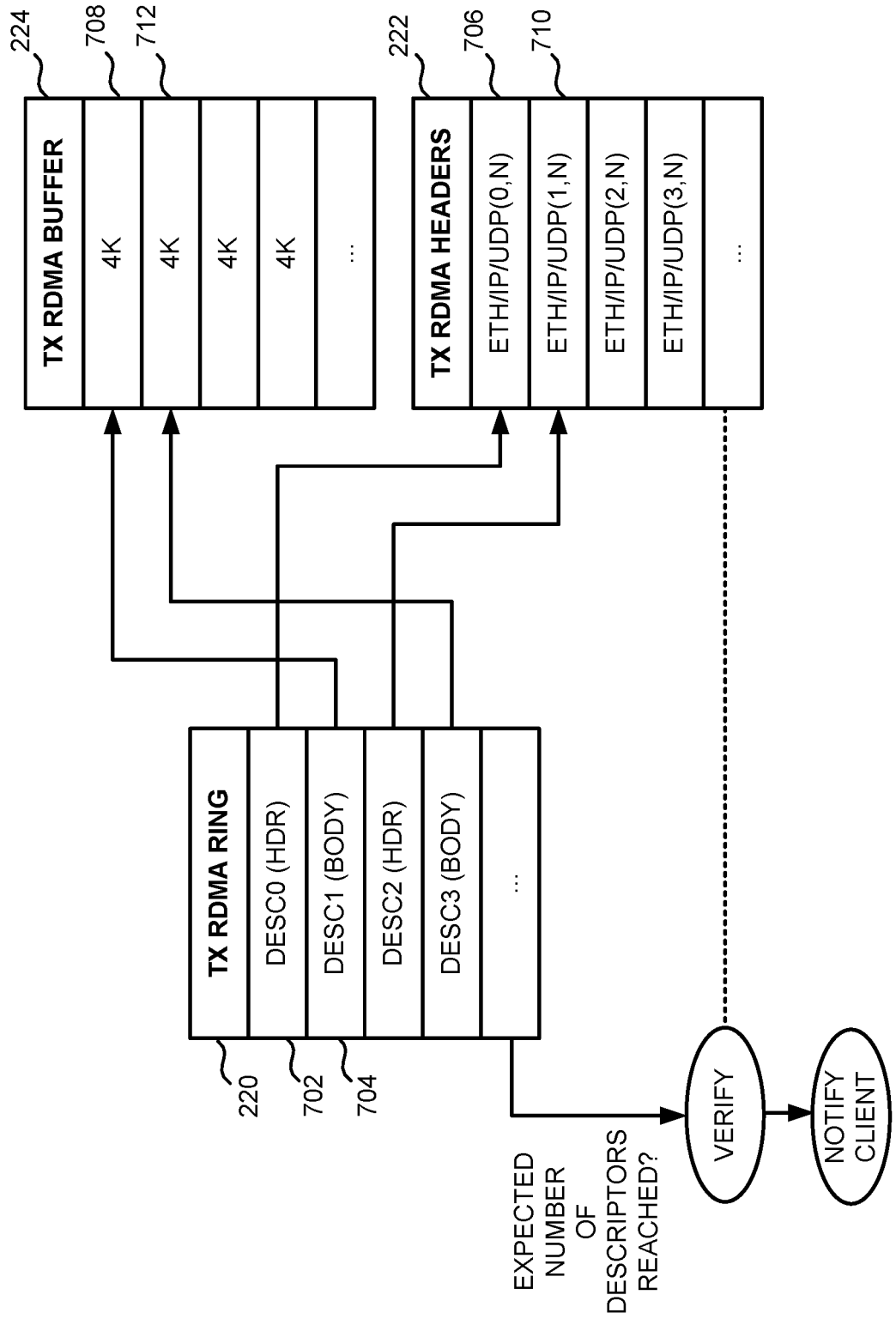
FIG. 7 illustrates one embodiment of the receiving ring buffer of FIG. 2 with headers and data segments split into respective data and header buffers.

FIG. 7 illustrates a block diagram corresponding to several of the receiving operations shown in FIG. 6 and described above. Multiple received sub-packets are shown received in the receive queue 220, at 702 and 704. The earliest received sub-packet with a header descriptor "DESC0" and a payload descriptor "DESC1" undergoes a header-split operation such that the header descriptor forms a first entry "ETH/IP/UDP(0,N)", at 706, in the header buffer 222. The data descriptor, including a packet payload of 4 Kbytes, is loaded as a first entry of the data buffer 224, at 708. The next earliest received sub-packet is split in a similar manner, with its header descriptor DESC2 being routed to a second entry in the header buffer, at 710, while its data payload is loaded as a second entry of the data buffer, at 712.

Figure 8:
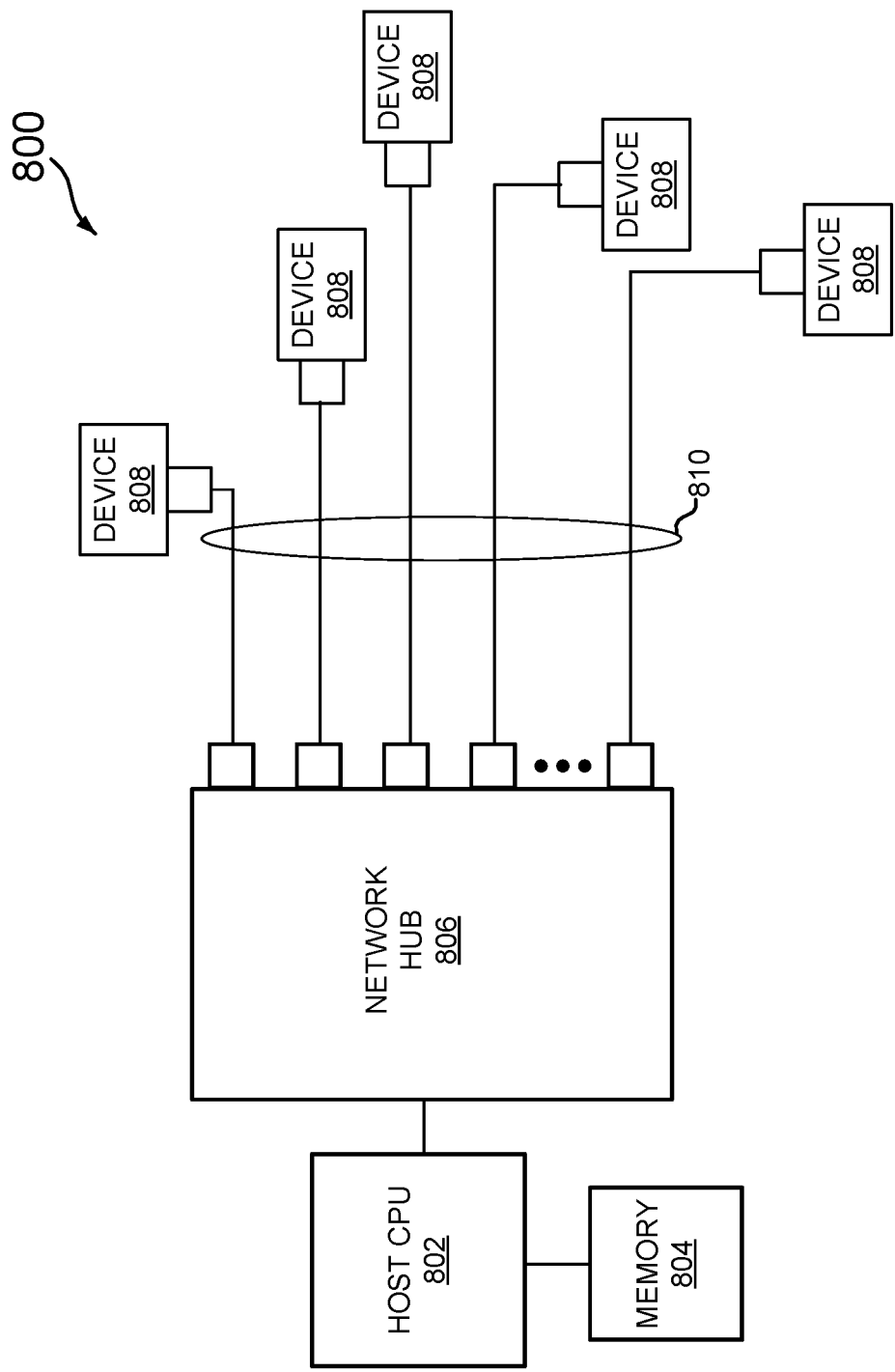
FIG. 8 illustrates a network of network devices such as those shown in FIG. 2.

The DMA transfer architecture and associated methods described above lend themselves well to low-power and low-cost networking environments. One such environment includes automotive networking, where a motor vehicle such as a car or truck employs an internal network of communicating devices to, for example, control autonomous driving operations. FIG. 8 illustrates one example of such a network, generally designated 800, where a centralized host/CPU 802 and a corresponding centralized memory 804 interacts with a network hub 806. The network hub forms a switching device for a plurality of network devices 808 in the form of automotive sensors and/or data-generating instruments to send collected data via multiple communications links 810. For some applications, one or more of the network devices 808 may be configured similarly to the transmit network device shown in FIG. 2, while the centralized host CPU 802 and memory 804 together form a configuration that is similar to the receiving network device of FIG. 2.

While the disclosure herein describes a particular network device as a transmitting network device and a link partner device as a receiving network device, in some embodiments, the circuitry and software to carry out both transmit and receive functions may be incorporated in each network device. For such embodiments, as a given network device is employed in a particular application, it may be subsequently configured as a transmitting or receiving network device.

It is noted that the embodiments described above enable direct memory access (DMA) transfers between memories of network devices without loading the respective CPUs with DMA operations. Further, re-using hardware employed in Ethernet transceivers enables use of traditional OSI networking stacks and other Ethernet-based environments. Additionally, the methods and apparatus described herein may be straightforwardly employed while avoiding any specific hardware requirements necessary for supporting certain transfer protocols.

While the disclosure herein has been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A computer device, comprising:
a network interface configured to transmit a plurality of data units in a sequenced order to a remote computer device via a network link;
a traffic monitor configured to receive traffic control signals from the remote computer device, the traffic control signals indicating that certain data units received by the remote computer device have been received or will likely be received out of the sequenced order, to cause the network interface to temporarily pause sending further data units; and
an egress processor separate from a central processing unit (CPU) associated with the computer device, configured to aggregate data segments stored in separate storage locations of a memory into the plurality of data units and to queue the plurality of data units in the sequenced order for sending by the network interface to the remote computer device;
wherein the egress processor is configured to:
aggregate the data segments using preconfigured descriptors that are reused to aggregate subsequent data segments in response to the aggregation of the data segments being incomplete; and
send the aggregated data segments to the queue in response to the aggregation of the data segments being complete.

2. A communication system, comprising the computer device of claim 1 and further comprising the remote computer device, wherein the remote computer device is configured to communicate with the computer device via the network link, and wherein the remote computer device comprises:
a second network interface configured to receive the plurality of data units sent by a remote the computer device over the network link, the plurality of data units being sent by the remote computer device in the sequenced order;
a second traffic monitor configured to monitor traffic on the network link, and to selectively send congestion notifications comprising the traffic control signals over the network link via the second network interface to the computer device, in response to having sensed that certain data units sent by the computer device have been received or will likely be received out of the sequenced order, to cause the computer device to temporarily pause sending further data units to maintain ongoing receipt of data units in the sequenced order;
an ingress processor, separate from a central processing unit (CPU) associated with the computer device, the ingress processor configured to detect a header segment of a received data unit and a corresponding payload segment of the received data unit; and a storage controller configured to store the header segment of the received data unit in a first memory location, and to store the corresponding payload segment of the received data unit in a second memory location separate from the first memory location, the second memory location corresponding to a next location in a storage queue.

3. The communication system of claim 2, wherein:
the ingress processor is further configured to split the detected header segment of the received data unit from the corresponding payload segment of the received data unit.

4. The communication system of claim 2, wherein:
the storage controller is configured to detect the header segment based on identifying descriptor information indicating at least a destination location of the second memory location for the corresponding payload segment.

5. The communication system of claim 2, wherein:
the second memory location is configured as a data queue, and independent of the first memory location; and
wherein the storage controller is configured to store a currently received payload segment in the data queue as-received via the network link, such that the currently received payload segment is stored in a first data queue storage location of the data queue following a second data queue storage location storing a most-recently received payload segment.

6. The communication system of claim 2, wherein:
the second memory location is configured as a ring buffer, including
multiple storage elements to store respective data entries,
an oldest entry pointer to indicate a storage element storing an oldest data entry,
a newest entry pointer to indicate a location of a newest data entry, and
a controller to dispatch oldest data entries from the ring buffer based on the oldest entry pointer, and to receive new entries into the ring buffer based on the newest entry pointer.

7. The communication system of claim 2, wherein:
the second memory location is configured as a linked list including multiple storage elements, wherein a first storage element of the multiple storage elements is logically coupled to a next storage element that is physically remote from the first storage element.

8. The communication system of claim 2, wherein:
the ingress processor is configured to detect an upper layer protocol header segment of the received data unit, the upper layer protocol header segment being compliant with a Transmission Control Protocol/Internet Protocol (TCP/IP) protocol or a User Datagram Protocol (UDP).

9. The communication system of claim 2, wherein:
the traffic monitor is configured to access the first memory location in a verification operation to verify that ordering of the stored payload segments in the second memory location conforms to the sequenced order of the plurality of data units as received from the remote computer device.

10. The computer device of claim 1, wherein:
for respective ones of the plurality of data units, the egress processor is configured to generate packet headers based on a respective first header descriptor representing packet header information and a respective second descriptor representing data information associated with a corresponding data payload of a corresponding one of the plurality of data units.

11. The computer device of claim 10, wherein:
the egress processor is configured to generate the packet headers as preconfigured TCP/IP or UDP headers.

12. The computer device of claim 1, wherein ones of the plurality of data units include data payloads, and wherein:
the egress processor is configured to queue the plurality of data units in the sequenced order without copying the data payloads.

13. The computer device of claim 1, wherein the aggregation of the data segments is incomplete if the aggregated data segments do not reflect complete contents of the memory.

14. The computer device of claim 1, wherein the aggregation of the data segments is complete if the aggregated data segments reflect complete contents of the memory.

15. The computer device of claim 1, wherein the egress processor is configured to pre-map portions of the memory with the preconfigured descriptors, each preconfigured descriptor representing one of the pre-mapped portions of the memory.

16. The computer device of claim 1, wherein the egress processor is configured to:
pre-map portions of the memory with the preconfigured descriptors, each preconfigured descriptor representing one of the portions of the memory;
fetch a data segment corresponding to one of the preconfigured descriptors from the memory;
wrap one of the data segments with the one of the preconfigured descriptors;
append the wrapped data segment to the aggregated data segments;
determine if the appending completes the aggregation of the data segments;
in response to determining that the appending completes the aggregation of the data segments, sending the aggregated data segments to the queue; and
in response to determining that the appending does not complete the aggregation, reusing the preconfigured descriptors to aggregate subsequent data segments.

* * * * *